Patented Sept. 6, 1932

1,875,746

UNITED STATES PATENT OFFICE

JEROME MARTIN AND LLOYD C. SWALLEN, OF TERRE HAUTE, INDIANA, ASSIGNORS TO COMMERCIAL SOLVENTS CORPORATION, OF TERRE HAUTE, INDIANA, A CORPORATION OF MARYLAND

PRODUCTION OF METHYLAMINE

No Drawing.   Application filed July 18, 1930.   Serial No. 468,992.

This invention relates to a process for producing methylamine from ammonia and methanol. It relates particularly to a process whereby high conversions of the reactants and good yields of monomethyl amine are obtained.

In the past methyl amine has been prepared synthetically by a number of different methods, among which is the process of using ammonia and methanol as the reactants. Sabatier and Maihle (Compt. Rend. 148, 898, (1909)) reported that various alcohols react with ammonia when the vapors are passed over thorium oxide or blue tungstic oxide at 350°–370° C., water being eliminated and the primary and secondary and some tertiary amine formed, but these investigators did not actually use methanol. Smolenski (Rocz. Chem. 1921, 1, 232–43) stated that when the vapors of methyl, ethyl, or amyl alcohol react with ammonia in the presence of dehydrating catalyst such as alumina at about 300° C., a satisfactory yield of primary, secondary, and tertiary amines is obtained but that secondary products such as olefines and ethers are obtained. Davis and Elderfield (J. Am. Chem. Soc. 50 (1928) 1786) reported that methyl amine is formed when methanol and ammonia are passed over a hot thorium oxide catalyst, the best temperatures appearing to be 325–330° C. and the best relative concentration about 0.80–0.83 mol of ammonia per mol of methanol. These investigators reported that under the best conditions nearly one-third of the methanol is converted into methyl amine. They also stated that no secondary or tertiary amines were produced. This statement as well as the yields reported by these investigators are believed to be inaccurate and misleading due to the unsatisfactory methods of analysis used by them.

In determining the value of a process for the production of methyl amine on a commercial scale it is necessary to consider several important points, for example, the rate of conversion of the ammonia and methanol, the extent of side reactions giving products other than methyl amine, and the ratios of the different methyl amines formed during the reaction. The latter point is of particular importance due to the difficulty in separating and recovering the different amines and to the uses to which the different amines may be applied. Extensive investigations have shown that up to the present time it is not possible to react ammonia and methanol and obtain only the monomethyl amine as has been claimed by prior workers. According to the present invention, however, it is shown that the ratios of the different methyl amines found by the reaction between ammonia and methanol may be regulated within certain determined limits by careful regulation of such factors as catalyst, rate of flow of reactants, temperature, ratio of ammonia to methanol, etc.

It has been found that generally dehydrating catalysts such as, for example, alumina, thoria, blue oxide of tungsten, chromic oxide, silica, titania, etc. may be satisfactorily used as catalysts for the production of methyl amine from ammonia and methanol. Of the various metal oxide dehydrating catalysts, however, alumina appears to give, for a number of reasons, somewhat better results. In this connection also, it should be noted that alumina in certain forms appears to give more satisfactory results than when used in certain of its other forms. For example, in selecting a catalyst for industrial use it is necessary to consider such factors as availability, initial cost, physical structure, chemical composition, necessity of subjecting material to preliminary purification or other treatment before it can be satisfactorily used as a catalyst, duration of life of the catalyst, possibility and ease of reactivation, catalysis of undesirable side-reactions, etc.

Good conversions of ammonia to methyl amine have been obtained, as will be shown by the data cited below, by means of aluminium oxide from many different sources and in many different forms. Satisfactory results with respect to this one factor have been obtained, for example, with alumina precipitated from aluminium sulfate, aluminium hydroxide, bauxite, alumina-gel, etc. From the point of view, however, of all of the requirements listed above somewhat more satisfactory results have been obtained by the use of a special form of alumina produced by the Aluminum Company of America by dehydrating aluminium hydroxide and designated as "Activated alumina 1110—G", than by the aid of any other material. This material, as just stated, is a partially dehydrated aluminium trihydrate and has a specific gravity of 3.25; it is granular in form and very resistant to crushing and abrasion; it will absorb 100% of the moisture from gases and vapors and is capable of the selective absorption of gaseous mixtures; its approximate chemical analysis is as follows:

|  | Per cent |
|---|---|
| $Al_2O_3$ | 91.23 |
| Loss on ignition | 7.10 |
| $Na_2O$ | 1.27 |
| $SiO_2$ | 0.08 |
| $Fe_2O_3$ | 0.01 |
| $TiO_2$ | 0.01 |

The procedure by which methyl amine is obtained according to the present invention may be illustrated as follows: The operation consists broadly in admitting ammonia gas and methanol to a vaporizer heated by suitable means. The temperature required at this point may, for example, be maintained by heating the vaporizer by means of the vapors of boiling butanol or other liquid of suitable boiling point. This procedure, however, is not essential to the successful operation of the process, and any other satisfactory means of heating may be employed. In any case, the mixed gases—ammonia and methanol—are then passed at the required rate thru the reactor containing the heated catalyst and finally suitably treated so as to recover and separate the methyl amine from the unconverted ammonia, methanol, water, and any by-products which may be formed during the reaction. Any suitable method of recovery may be employed, as for example, the gases leaving the reaction vessel may be absorbed in concentrated hydrochloric acid and the resulting amine hydrochlorides separated and the desired amines obtained. Or, if preferred, the amines may be separated and recovered by fractional distillation under pressure according to the procedure outlined in a co-pending application.

While, as previously indicated, other kinds of dehydrating catalysts may also be employed, the most satisfactory general results have been obtained by the use of some form of aluminium oxide or hydroxide. Results showing the use of such catalysts under varying conditions are shown in the following table.

Table I

| Catalyst | Temp. °C. | Mols $NH_3$ / Mols MeOH | Space Velocity | Conv. of $NH_3$ | Monoamine in product % |
|---|---|---|---|---|---|
| Bauxite (1) | 400 | 1.57 | 140 | 51 | 45 |
| Bauxite (2) | 350 | 2.00 | 140 | 50 | 45 |
| Alumina from $Al_2(SO_4)_3$ | 400 | 2.05 | 100 | 40 | 70 |
| Alumina on pumice | 400 | 2.00 | 140 | 20 | 75 |
| Aluminium hydroxide | 400 | 2.00 | 100 | 25 | 55 |
| A.A. 1110—G* | 450 | 2.00 | 110 | 30 | 55 |
| A.A. 1110—G | 450 | 2.00 | 550 | 30 | 60 |
| A.A. 1110—G | 450 | 3.70 | 1100 | 14 | 89 |
| A.A. 1110—G | 450 | 2.30 | 1100 | 22 | 78 |
| A.A. 1110—G | 450 | 2.40 | 2700 | 14 | 80 |
| A.A. 1110—G | 450 | 1.80 | 1600 | 28 | 67 |
| A.A. 1110—G | 475 | 2.22 | 1100 | 22.5 | 70 |
| A.A. 1110—G | 400 | 2.22 | 1100 | 22.5 | 73 |
| Thorium oxide on pumice | 400 | 1.00 | 100 | 5–8 |  |

*Activated alumina 1110—G.

It may readily be seen from a consideration of data given above that the final results obtained are regulated by the catalyst, the temperature at which the reaction is carried out, the ratio of the amount of ammonia to the amount of methanol passed over the catalyst, the space velocity of the gaseous mixture being reacted, as well as certain other factors to be discussed below. By the term "spaced velocity", as used above, is meant the number of cubic centimeters of reacting gases per cubic centimeter of catalyst passed over the latter per hour.

Variations of the factors above enumerated generally lead to changes in both the rates of conversion of the raw materials and in the ratio of monomethyl to the secondary and tertiary methyl amines, and hence these factors may be varied within certain limits as different products are desired or as the particular method of operation and recovery of the products may require. For example, the temperature of the catalyst may be varied from about 300° C. to about 500° C. For most purposes, however, it is preferable to operate within the range 350°–450° C., and better still at about 400° C.

The ratio of ammonia to methanol is to a very large extent determined by the method of operation and the economy of recovering the products formed during the reaction. By using a gas mixture consisting of say six parts of ammonia to one part of methanol, approximately 95% of the methyl amine formed will be the monomethylamine, but only approximately 7% of the ammonia will be converted, thus necessitating greatly increased expense in recovering the unused portions of the raw material. On the other hand, assuming that the other factors are left the same, if the gas mixture contains only about one part of ammonia to one part of methanol, the monomethyl amine content of the methyl amine formed will be reduced to approximately 30-40%, but the conversion of the ammonia to methyl amine will be increased to approximately 35-40%. In order, therefore, to obtain as high a proportion of monomethyl amine as possible under the most economical conditions it is necessary to assume an intermediate figure for the ammonia-methanol ratio. A ratio of approximately 2.2 appears to give about the most satisfactory results under general operating conditions.

The space velocity of the reacting gases may be varied from 100 to about 3500. The conversion at 550 is equal to that at 110, other conditions being the same. Above 1100 space velocity the conversion appears to begin to decrease.

The operating conditions and particularly the temperature employed depend to some extent also upon the catalytic effect of the metals from which the catalytic apparatus is constructed. "Activated alumina 1110—G" does not crack methanol at 400° C. but does begin to show some cracking above 425° C. When, however, the heated catalyst container is constructed of cast iron or cold rolled steel the cracking of the methanol is accelerated appreciably. On the other hand, when copper metal is employed there appears not only to be no increase in the cracking of the methanol at a given temperature, but there even appears to be a slight decrease in the tendency for this undesired reaction to take place. From a consideration of these factors, therefore, it is apparent that more satisfactory results are obtainable when the heated surfaces of the apparatus with which the reacting gases come into contact are constructed of copper metal rather than of iron or steel.

What is claimed is:

1. Process for the production of methyl amine which comprises passing a gaseous mixture comprising one part methanol and one to six parts ammonia at temperatures ranging from 300° to 500° C. over metallic oxide dehydrating catalysts.

2. Process for the production of methyl amine which comprises passing methanol with a molecular excess of ammonia at temperatures ranging from 300° to 500° C. and at space velocities ranging from 100 to 3500 over metallic oxide dehydrating catalysts.

3. Process for the production of methyl amine which comprises passing a gaseous mixture comprising one part methanol and one to six parts ammonia at about 400° C. over metallic oxide dehydrating catalysts.

4. Process for the production of methyl amine which comprises passing a gaseous mixture comprising one part methanol and one to six parts ammonia at about 400° C. and at a space velocity of about 1100 over metallic oxide dehydrating catalysts.

5. A process for the production of methyl amine, the steps which comprise passing a mixture of methanol with a molecular excess of ammonia at temperatures ranging from 300° to 500° C. over catalysts comprising aluminium oxide.

6. In a process for the production of methylamine, the steps which comprise passing a mixture of methanol and ammonia at temperatures ranging from 300° to 500° C. and at space velocities ranging from 100 to 3500 over catalysts comprising aluminium oxide.

7. In a process for the production of methylamine, the steps which comprise passing a mixture of methanol and ammonia at about 400° C. and at a space velocity of about 1100 over catalysts comprising aluminium oxide.

8. In a process for the production of methylamine, the steps which comprise passing a mixture of methanol and ammonia at temperatures ranging from 300° to 500° C. over catalysts comprising dehydrated aluminium hydroxide.

9. In a process for the production of methylamine, the steps which comprise passing a mixture of methanol and ammonia at temperatures ranging from 300° to 500° C. and at space velocities ranging from 100 to 3500 over catalysts comprising dehydrated aluminium hydroxide.

10. In a process for the production of methylamine, the steps which comprise passing methanol and a molecular excess of ammonia at temperatures ranging from 300° to 500° and at space velocities ranging from 100 to 3500 over catalysts comprising dehydrated aluminium hydroxide.

11. In a process for the production of monomethylamine, the steps which comprise passing methanol and a molecular excess of ammonia at temperatures ranging from 300° to 500° C. and at space velocities ranging from 100 to 3500 over catalysts comprising dehydrated aluminium hydroxide.

12. In a process for the production of methylamine from methanol and ammonia in the presence of a metallic oxide dehydrating catalyst capable of causing the formation of methylamine by the reaction of said materials, the step which comprises completely excluding iron from the heated reactants.

In testimony whereof we affix our signatures.

JEROME MARTIN.
LLOYD C. SWALLEN.

DISCLAIMER 1,875,746.—*Jerome Martin* and *Lloyd C. Swallen*, Terre Haute, Ind. PRODUCTION OF METHYLAMINE. Patent dated September 6, 1932. Disclaimer filed December 10, 1934, by the assignee, *Commercial Solvents Corporation*.

Hereby enters this disclaimer to that part of the claim in said specification which is in the following words, to wit:

"1. Process for the production of methylamine which comprises passing a gaseous mixture comprising one part methanol and one to six parts ammonia at temperatures ranging from 300° to 500° C. over metallic oxide dehydrating catalysts.

"2. Process for the production of methylamine which comprises passing methanol with a molecular excess of ammonia at temperatures ranging from 300° to 500° C. and at space velocities ranging from 100 to 3500 over metallic oxide dehydrating catalysts.

"3. Process for the production of methylamine which comprises passing a gaseous mixture comprising one part methanol and one to six parts ammonia at about 400° C. over metallic oxide dehydrating catalysts.

"4. Process for the production of methylamine which comprises passing a gaseous mixture comprising one part methanol and one to six parts ammonia at about 400° C. and at a space velocity of about 1100 over metallic oxide dehydrating catalysts.

"5. A process for the production of methylamine, the steps which comprise passing a mixture of methanol with a molecular excess of ammonia at temperatures ranging from 300° to 500° C. over catalysts comprising aluminium oxide.

"6. In a process for the production of methylamine, the steps which comprise passing a mixture of methanol and ammonia at temperatures ranging from 300° to 500° C. and at space velocities ranging from 100 to 3500 over catalysts comprising aluminium oxide.

"7. In a process for the production of methylamine, the steps which comprise passing a mixture of methanol and ammonia at about 400° C. and at a space velocity of about 1100 over catalysts comprising aluminium oxide.

"8. In a process for the production of methylamine, the steps which comprise passing a mixture of methanol and ammonia at temperatures ranging from 300° to 500° C. over catalysts comprising dehydrated aluminium hydroxide.

"9. In a process for the production of methylamine, the steps which comprise passing a mixture of methanol and ammonia at temperatures ranging from 300° to 500° C. and at space velocities ranging from 100 to 3500 over catalysts comprising dehydrated aluminium hydroxide.

"10. In a process for the production of methylamine, the steps which comprise passing methanol and a molecular excess of ammonia at temperatures ranging from 300° to 500° and at space velocities ranging from 100 to 3500 over catalysts comprising dehydrated aluminium hydroxide.

"11. In a process for the production of monomethylamine, the steps which comprise passing methanol and a molecular excess of ammonia at temperatures ranging from 300° to 500° C. and at space velocities ranging from 100 to 3500 over catalysts comprising dehydrated aluminium hydroxide."

[*Official Gazette January 8, 1935.*]